US008710785B2

(12) United States Patent
Foster (10) Patent No.: US 8,710,785 B2
(45) Date of Patent: Apr. 29, 2014

(54) METHOD OF OPERATING AN ELECTROMECHANICAL CONVERTER, A CONTROLLER AND A COMPUTER PROGRAM PRODUCT

(75) Inventor: Darren Leigh Foster, Eindhoven (NL)

(73) Assignee: Nederlandse Organisatie voor Toegepast-Natuurwetenschappelijk Onderzoek Tno, Delft (NL)

( * ) Notice: Subject to any disclaimer, the term of this patent is extended or adjusted under 35 U.S.C. 154(b) by 876 days.

(21) Appl. No.: 12/808,842

(22) PCT Filed: Dec. 18, 2008

(86) PCT No.: PCT/NL2008/050815
§ 371 (c)(1),
(2), (4) Date: Sep. 16, 2010

(87) PCT Pub. No.: WO2009/078720
PCT Pub. Date: Jun. 25, 2009

(65) Prior Publication Data
US 2012/0025747 A1  Feb. 2, 2012

(30) Foreign Application Priority Data

Dec. 18, 2007 (EP) .................................... 07076103

(51) Int. Cl.
*H02P 1/00* (2006.01)
(52) U.S. Cl.
USPC ............ 318/495; 318/716; 318/721; 318/491
(58) Field of Classification Search
USPC .............. 318/400.02, 400.41, 716, 721, 722, 318/491, 493, 495; 310/109, 112, 113, 114, 310/115, 154.01, 154.08, 154.09, 154.33, 310/154.34, 266
See application file for complete search history.

(56) References Cited

U.S. PATENT DOCUMENTS 4,442,730 A  4/1984  Snoy
4,643,040 A  2/1987  Adam et al.
(Continued)

FOREIGN PATENT DOCUMENTS

CN  1572052 A  1/2005
EP  0872396 A2  10/1998
(Continued)

OTHER PUBLICATIONS

Okamura et al., "Development of Hybrid Electric Drive System Using a Boost Converter," Toyota Motor Corporation, Toyota Hybrid System THSII, Press Release Apr. 17, 2003.

*Primary Examiner* — Eduardo Colon Santana
*Assistant Examiner* — Thai Dinh
(74) *Attorney, Agent, or Firm* — Birch, Stewart, Kolasch & Birch, LLP (57) ABSTRACT

The invention relates to a method of operating an electromechanical converter, in particular an electric variable transmission, provided with a primary shaft having a rotor mounted thereon, a secondary shaft having an interrotor mounted thereon, and a stator, fixedly mounted to the housing of the electromechanical converter, wherein, viewed from the primary shaft in radial direction, the rotor, the interrotor and the stator are arranged concentrically relative to each other. The rotor and the stator are designed with one or more windings. Further, the interrotor forms one whole both mechanically and electromagnetically, and is arranged as a conductor for magnetic flux in an at least tangential direction. The method comprises the step of variably controlling a magnetic rotor flux.

18 Claims, 5 Drawing Sheets

(56) References Cited

U.S. PATENT DOCUMENTS

| | | | |
|---|---|---|---|
| 4,722,248 A | 2/1988 | Braun | |
| 5,021,724 A | 6/1991 | Hirano et al. | |
| 5,027,670 A | 7/1991 | Adam | |
| 5,040,430 A | 8/1991 | Adam et al. | |
| 5,117,710 A | 6/1992 | Asano et al. | |
| 5,172,784 A | 12/1992 | Varela, Jr. | |
| 5,233,525 A | 8/1993 | Overmann et al. | |
| 5,264,764 A | 11/1993 | Kuang | |
| 5,318,142 A | 6/1994 | Bates et al. | |
| 5,335,568 A | 8/1994 | Kammerl et al. | |
| 5,351,776 A | 10/1994 | Keller et al. | |
| 5,418,437 A | 5/1995 | Couture et al. | |
| 5,427,196 A | 6/1995 | Yamaguchi et al. | |
| 5,436,834 A | 7/1995 | Graf et al. | |
| 5,468,198 A | 11/1995 | Holbrook et al. | |
| 5,558,589 A | 9/1996 | Schmidt | |
| 5,637,987 A | 6/1997 | Fattic et al. | |
| 5,650,713 A | 7/1997 | Takeuchi et al. | |
| 5,722,502 A | 3/1998 | Kubo | |
| 5,761,628 A | 6/1998 | Steeby et al. | |
| 5,771,478 A | 6/1998 | Tsukamoto et al. | |
| 5,775,449 A | 7/1998 | Moroto et al. | |
| 5,845,224 A | 12/1998 | McKee | |
| 5,865,263 A | 2/1999 | Yamaguchi et al. | |
| 5,875,410 A | 2/1999 | Fowler et al. | |
| 5,917,248 A | 6/1999 | Seguchi et al. | |
| 5,941,137 A | 8/1999 | Beer et al. | |
| 5,994,870 A * | 11/1999 | Kaneko et al. | 318/798 |
| 6,019,183 A | 2/2000 | Shimasaki et al. | |
| 6,048,288 A | 4/2000 | Tsujii et al. | |
| 6,054,776 A | 4/2000 | Sumi | |
| 6,054,786 A * | 4/2000 | Springer | 310/40 MM |
| 6,083,139 A | 7/2000 | Deguchi et al. | |
| 6,089,512 A | 7/2000 | Ansorge et al. | |
| 6,104,159 A | 8/2000 | Seok | |
| 6,148,855 A | 11/2000 | Rauner et al. | |
| 6,176,807 B1 | 1/2001 | Oba et al. | |
| 6,287,237 B1 | 9/2001 | Graf et al. | |
| 6,320,349 B1* | 11/2001 | Kaneko et al. | 318/798 |
| 6,383,114 B1 | 5/2002 | Hoshiya et al. | |
| 6,409,623 B1 | 6/2002 | Hoshiya et al. | |
| 6,442,080 B2 | 8/2002 | Tanzawa et al. | |
| 6,469,402 B2 | 10/2002 | Morimoto et al. | |
| 6,488,609 B1 | 12/2002 | Morimoto et al. | |
| 6,494,809 B1 | 12/2002 | Suzuki et al. | |
| 6,533,703 B2 | 3/2003 | Michau et al. | |
| 6,541,876 B2 | 4/2003 | Shimizu et al. | |
| 6,558,287 B2 | 5/2003 | Hayabuchi et al. | |
| 6,612,386 B2 | 9/2003 | Tamai et al. | |
| 6,616,569 B2 | 9/2003 | Hoang et al. | |
| 6,626,056 B2 | 9/2003 | Albert et al. | |
| 6,713,889 B2 | 3/2004 | Dietz et al. | |
| 6,739,418 B2 | 5/2004 | Ogata et al. | |
| 6,752,036 B2 | 6/2004 | Kropp et al. | |
| 6,768,215 B2 | 7/2004 | Souki et al. | |
| 6,920,383 B2 | 7/2005 | Graf et al. | |
| 6,952,057 B2 | 10/2005 | Tajima et al. | |
| 6,997,831 B2 | 2/2006 | Kanda et al. | |
| 6,998,727 B2 | 2/2006 | Gray, Jr. | |
| 7,164,219 B2 * | 1/2007 | Hoeijmakers | 310/266 |
| 7,469,612 B2 | 12/2008 | Rouphael et al. | |
| 2003/0057796 A1 | 3/2003 | Fan et al. | |
| 2004/0119373 A1 | 6/2004 | Akatsu | |
| 2005/0077800 A1* | 4/2005 | Hoeijmakers | 310/266 |
| 2005/0082992 A1 | 4/2005 | Aizawa et al. | |
| 2005/0084191 A1 | 4/2005 | Fees et al. | |
| 2005/0285556 A1 | 12/2005 | Chen et al. | |
| 2006/0035736 A1 | 2/2006 | Umeda et al. | |
| 2006/0055363 A1 | 3/2006 | Patel et al. | |
| 2007/0129198 A1 | 6/2007 | Atarashi | |

FOREIGN PATENT DOCUMENTS

| | | |
|---|---|---|
| EP | 1146257 A2 | 10/2001 |
| EP | 1 154 551 A2 | 11/2001 |
| EP | 1330013 A1 | 7/2003 |
| EP | 1389825 A2 | 2/2004 |
| EP | 1526308 A1 | 4/2005 |
| EP | 1625991 A1 | 2/2006 |
| EP | 1832466 A1 | 9/2007 |
| JP | 05-284611 A | 10/1993 |
| JP | 8-214475 A | 8/1996 |
| JP | 10-243679 A | 9/1998 |
| JP | 2000-253635 A | 9/2000 |
| JP | 2003-111318 A | 4/2003 |
| JP | 2004-135375 A | 4/2004 |
| JP | 2005-119584 A | 5/2005 |
| JP | 2005-124346 A | 5/2005 |
| JP | 2005-519571 A | 6/2005 |
| JP | 2005-214105 A | 8/2005 |
| JP | 2005-341696 A | 12/2005 |
| JP | 2005-348472 A | 12/2005 |
| JP | 2007-195387 A | 8/2007 |
| JP | 2007-237782 A | 9/2007 |
| WO | WO 00/34066 A1 | 6/2000 |
| WO | WO 01/56826 A1 | 8/2001 |
| WO | WO 02/057659 A2 | 7/2002 |
| WO | WO 03/019046 A1 | 3/2003 |
| WO | WO 03/052538 A1 | 6/2003 |
| WO | WO 03/075437 A1 | 9/2003 |
| WO | WO 2004/069573 A1 | 8/2004 |
| WO | WO 2005/038307 A1 | 4/2005 |
| WO | WO 2009/078720 A1 | 6/2009 |

* cited by examiner

METHOD OF OPERATING AN ELECTROMECHANICAL CONVERTER, A CONTROLLER AND A COMPUTER PROGRAM PRODUCT

The invention relates to a method of operating an electromechanical converter, in particular an electric variable transmission, provided with a primary shaft having a rotor mounted thereon, a secondary shaft having an interrotor mounted thereon, and a stator, fixedly mounted to the housing of the electromechanical converter, wherein, viewed from the primary shaft in radial direction, the rotor, the interrotor and the stator are arranged concentrically relative to each other, and wherein the rotor and the stator are designed with one or more windings, wherein the interrotor forms one whole both mechanically and electromagnetically, and is arranged as a conductor for magnetic flux in an at least tangential direction.

An electric variable transmission (EVT) is an electromechanical converter with two mechanical ports, viz. a primary (driving) shaft and a secondary (driven) shaft, and an electric gate via which energy can be exchanged. If the electric gate is not used, the EVT works as a common infinitely variable transmission, where the transfer ratio has a very wide range. The EVT fulfills a function that is comparable to that of a combination of a clutch and a gearbox of a vehicle. In combination with the EVT, the combustion engine in fact works as a power source, whereby the speed can be set according to an optimum characteristic of the engine. The fuel consumption, the noise level and the emission of noxious gases from the vehicle can thus be reduced. Because the EVT is an infinitely variable transmission, there are no gearshifting shocks during acceleration. It also means that always acceleration with a constant (maximally permissible) power is possible, and not, as in a conventional gearbox, with a more or less sawtooth-shaped course of the power as a function of the time. With the same engine, the acceleration with an EVT therefore proceeds faster than with a conventional gearbox.

The EVT can work as a substantially wear-free starter motor by connecting the electric gate to an on-board battery. As a consequence, city buses equipped with an EVT, can, for instance, switch off their engine at bus stops without any objection, which is more comfortable and moreover leads to a substantial saving of fuel, since frequent starting entails undue wear of the starter motor and the starter ring in conventional starter motors.

Via the electric gate, optionally via a power electronic converter, the on-board network can be supplied and hence the on-board battery can be charged. Thus, a substantially wear-free alternator has been obtained. Since conventional dynamos have a poor efficiency, this also leads to a saving of fuel. In an electric system with a common dynamo, the power is practically limited by the belt drive and the low on-board voltage. In the use of the EVT, optionally via power electronic converters, higher voltage levels can be simply created and the power is limited only by the combustion engine. This means that some auxiliary provisions that are now driven directly by the engine, such as, for instance, the pump for the power steering, or the compressor in buses, can be driven electrically with a high efficiency. They can then be switched on and off at will, so that the no-load losses are less. This also leads to fuel saving.

With the EVT, it is simply possible to brake by way of the motor. The braking power can then be increased by increasing the speed of the engine. However, this is accompanied by an increased noise production. In addition, it is possible to dissipate the brake energy in resistances that are connected to the electric gate. This makes it possible to brake to a halt, this in contrast, for instance, to a conventional retarder in buses. When braking, possibly, the motor can even be switched off, so that the fuel consumption is reduced and the engine does not produce any noise.

To the electric gate, an electrical energy storage system in the form of a battery, supercap and/or a flywheel system can be connected. With these, brake energy can be stored, which can subsequently be used again for acceleration. This relatively costly extension can, particularly with local buses, yield a substantial saving of fuel.

The electric gate makes the converter particularly suitable for use in hybrid vehicles; the mechanical energy for the cardan shaft can be produced both by the IC engine and by an electric source.

An electromechanical converter, as is described in the opening paragraph, is known from the International patent publication WO 03/075437. The two rotor parts of the electromechanical converter described therein have been electromagnetically coupled and have further been integrated into one whole, so that a desired volume and weight saving is rendered possible. In the electromechanical converter, of course, a magnetic flux conduction in radial direction remains present.

The parts of the electric machine in WO '437 are electromagnetically coupled: flux transfer can take place from the rotor via the interrotor to the stator and vice versa. The machine forms one whole both mechanically and electromagnetically. The parts of the electromagnetic transmission are controlled by a single control device. Owing to the feature that the interrotor forms not only a conductor for the magnetic flux in the radial direction but also in the tangential direction, it is rendered possible, to use flux attenuation in one part of the electromechanical converter, while this is not done in the other part of the converter.

The output torque of the converter is determined by the interrotor frequency, while the machine input torque depends on the angle of the outer and inner field in combination with the interrotor frequency. During operation of the electromechanical converter one or more physical parameters are controlled to obtain a desired power and speed of the interrotor. At relatively high rotational speeds, a voltage differential over the windings of the stator, and thus the stator flux, can be reduced in order to restrict a back electromagnetic force (EMF) so that voltage differential values exceeding system limitations are counteracted. However, the efficiency of the electromechanical converter under stator field weakening conditions might deteriorate.

It is an object of the invention to provide a method of operating an electromechanical converter according to the opening paragraph wherein the efficiency is improved. Thereto, according to the invention, the method comprises the step of variably controlling a magnetic rotor flux such that a magnetic saturation in the interrotor decreases.

The invention is partly based on the insight that under field weakening conditions, the rotor magnetises the interrotor, leading to high rotor copper losses, especially when the interrotor operates in a saturation region. This has some drawbacks as the rotor cannot easily be cooled and the rotor has a lower torque capacity than the stator. Further, the interrotor flux increases leading to iron losses in the interrotor. As a result, the efficiency of the electromechanical converter deteriorates under stator field weakening conditions.

It is noted that the stator under field weakening conditions has a minor contribution to a magnetisation of the interrotor.

By variably controlling a magnetic rotor flux such that a magnetic saturation in the interrotor decreases, a work point on the interrotor magnetisation curve can be modified such that the interrotor is less saturated, so that copper losses in the rotor, as well as iron losses in the interrotor can be reduced, thereby improving the efficiency of the electromechanical converter.

In this context, it is noted that the magnetic rotor flux can comprise different components, i.e. a magnetic flux that extends merely in the rotor, a magnetic flux that extends into the gap between the rotor and interrotor and a flux linking the inner squirrel cage in the interrotor. The above-mentioned components are mutually related, so that controlling one or more of said rotor flux components can in principle lead to a desired modification of the work point on the interrotor magnetisation curve.

Advantageously, the magnetic rotor flux can be reduced under stator field weakening conditions, thereby reducing copper losses in the rotor, as well as iron losses in the interrotor, as the interrotor is thus less saturated. The reduction of losses is obtained by overruling the commonly applied idea of generating a maximum field.

The invention not only relates to an electromechanical converter, but also to an apparatus provided with an electromechanical converter as described above for starting a driving combustion engine or for supplying electrical equipment, and to an apparatus provided with an electromechanical converter as described above and provided with a system for the storage of energy.

The invention also relates to a controller.

Further, the invention relates to a computer program product.

Other advantageous embodiments according to the invention are described in the following claims.

By way of example only, embodiments of the present invention will now be described with reference to the accompanying figures in which

It is noted that the figures shows merely preferred embodiments according to the invention. In the figures, the same reference numbers refer to equal or corresponding parts.

Figure 1:
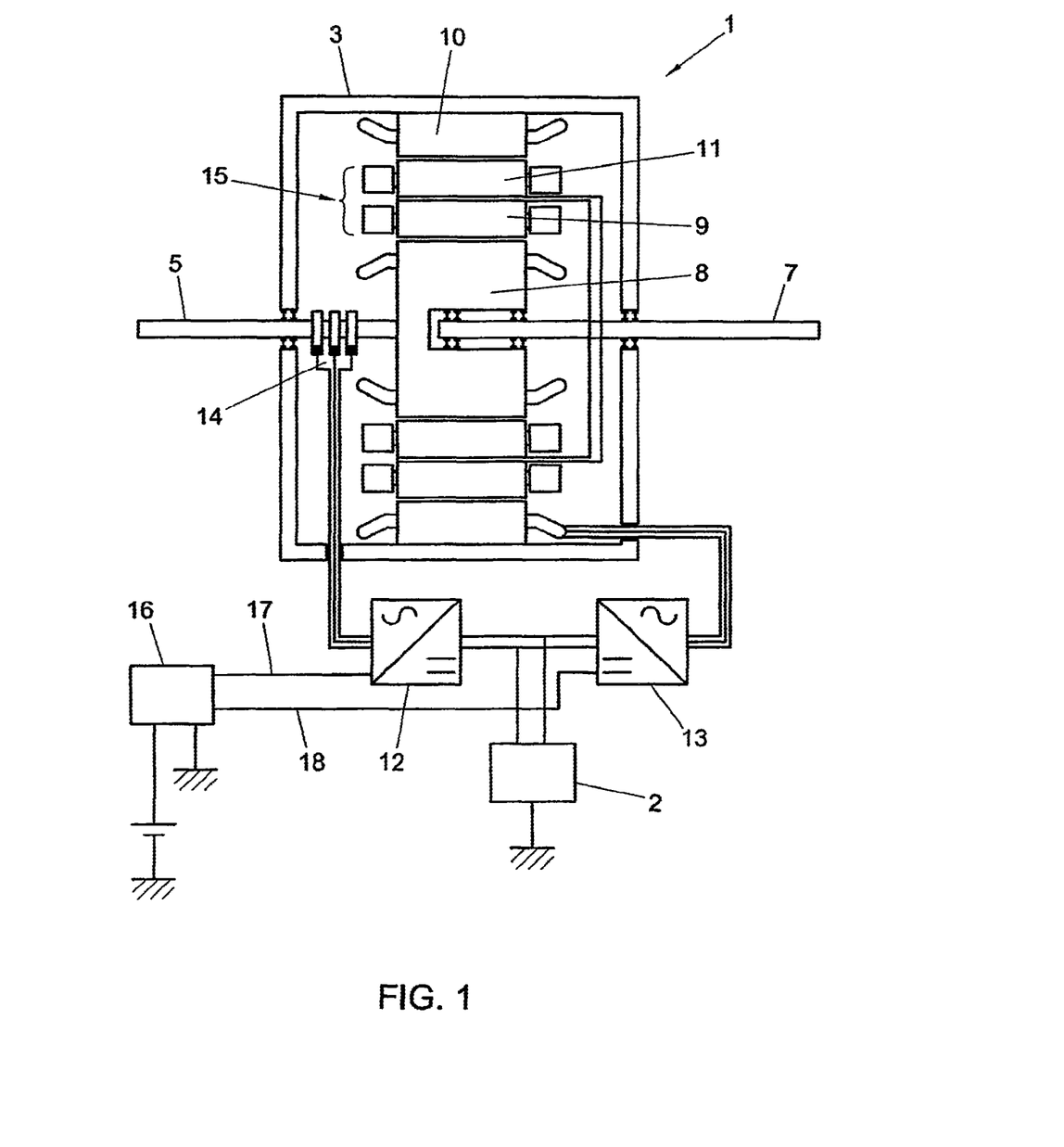
FIG. 1 shows a schematic cross sectional view of an electric variable transmission.

FIG. 1 shows a first embodiment of an electromechanical converter 1 according to the invention.

The electric variable transmission (EVT) is an electromechanical converter with two mechanical gates and one electric gate. The EVT is primarily an infinitely variable transmission, while moreover via the electric gate energy can be exchanged.

The basic structure of an electric variable transmission (EVT) is schematically represented in FIG. 1 and is known from the International patent publication WO 03/075437. This EVT is built up from an electromechanical part 1 and a power electronic part 12, 13. The electromechanical part 1 comprises a housing 3 in which a primary induction machine with a primary shaft 5 and a secondary induction machine with a secondary shaft 7 are arranged. The two shafts 5 and 7 are bearing-mounted in the housing 3. The primary induction machine comprises in this embodiment a rotor 8 formed by a slip ring armature with an electrically accessible polyphase winding, and a non-electrically accessible cage armature 9. The secondary induction machine comprises a stationary part, the stator 10, fixedly connected with the housing 3, and a cage armature 11 mounted on the secondary shaft 7. The secondary shaft 7 of the secondary induction machine is also bearing mounted in the rotor 8. The stator 10 has an electrically accessible polyphase winding. Between the rotor 8 and the stator 10, electric energy can be exchanged via a control unit, which here comprises a first power electronic AC/DC converter 12 connected to rotor windings via a combination 14 of slip rings and brushes, and a second power electronic AC/DC converter 13, which are both designed as an alternating voltage-direct voltage inverter. The DC terminals of the two inverters 12, 13 are interconnected and connected to a DC storage energy system 2, such as a battery or a supercap. The control unit comprises a controlling element 16 for controlling electrical currents flowing in the windings. Therefore, the controlling element 16 controls the inverters 12, 13 via data lines 17, 18. The primary and secondary induction cage armature 9, 11 jointly form an interrotor 15. The basis of the EVT is the primary induction machine which works as a regenerating electromagnetic clutch, enabling low loss speed ratio control. The secondary machine, which is fed by the regenerated energy from the primary machine, works as an auxiliary motor enabling torque multiplication.

The interrotor comprises one more electric circuits and a magnetic circuit. In a first embodiment according to the invention, the magnetic circuit is formed by a cylindrical yoke which is provided on the radial inner and outer side with teeth between which longitudinally extending grooves are situated in which extend shortcircuit windings forming the electric circuit. In a second embodiment, the interrotor is formed by a magnetic flux conducting cylindrical yoke, while on the radial inner and outer side permanently magnetic material, for instance in the form of blocks, is arranged. In a third embodiment, the interrotor is formed by a magnetic flux conducting cylindrical yoke, while on the one side permanently magnetic material is provided and on the other side longitudinally extending grooves are arranged in which an electrically accessible winding is provided. In the latter case, however, it is to be ensured that a current supply point be present on the interrotor or on the secondary shaft; on the secondary shaft, slip rings can be easily mounted, via which current can be supplied or removed.

Preferably, the magnetic flux conducting circuit of the interrotor, in particular the yoke with teeth between which grooves are located, has a substantially smooth surface on the radial inner side and/or the radial outer side of the interrotor. In particular, the radial inner and/or outer side of the magnetic flux conducting material of the circuit are parts reaching outwards freely with respect to the contour of the circuit. What is thus achieved is that salient poles are absent which impose a predetermined fixed pattern of magnetic poles on the magnetic flux conducting material of the interrotor, so that the pattern of magnetic poles in the magnetic flux conducting material of the interrotor is free and can be varied during operation. It is noted that in this context a substantially smooth surface is understood to mean not only a completely smooth surface, but can also comprise a surface having, with respect to a smooth, for instance circular cylindrical contour, grooves (slots) directed radially inwards with respect to the circuit. Such recesses then comprise less than half of the total circumference of, respectively, the radial inner or outer side of the circuit, preferably less than about 20-30% of the circumference.

In an embodiment according to an aspect of the invention, the interrotor comprises a magnetic and an electric circuit, the magnetic circuit including a magnetic flux conducting cylinder and the electric circuit including a number of electric circuit-forming windings extending in the flux conducting cylinder, and wherein the interrotor is arranged as a conductor for the magnetic flux in a tangential and radial direction so that exertion of a direct torque between the rotor and the stator can occur upon magnetic saturation of the interrotor.

Figure 2:
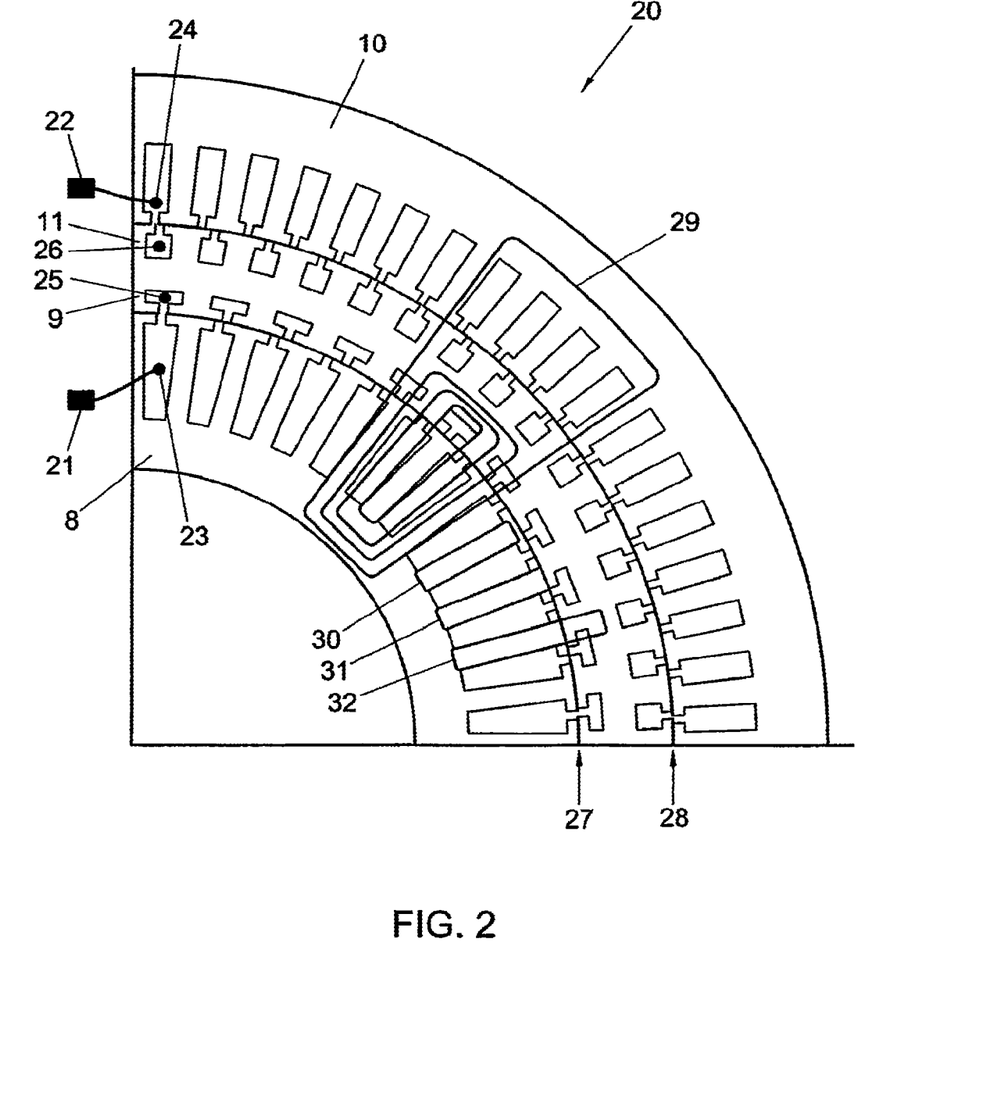
FIG. 2 shows a partial cross section of a rotor-interrotor-stator combination in the electric variable transmission of FIG. 1.

FIG. 2 shows a partial cross section 20 of a rotor-interrotor-stator combination in the electric variable transmission of the electric variable transmission of FIG. 1. The rotor 8 comprises polyphase windings 23 that are electrically accessible via rotor terminal sections 21 having slip rings. Similarly, the stator 10 is provided with polyphase windings 24 that are electrically accessible via stator terminal sections 22. The rotor and stator windings 23, 24 are connected to the inverters 12 and 13 as described referring to FIG. 1. Both in the rotor and stator windings 23, 24 copper losses occur. Copper losses are a consequence of heat conversion generated by electric current in the windings. Further, iron losses occur. The iron losses are generated by magnetic flux hysteresis and/or eddy currents. Further, due to the presence of stray flux, the generated flux can is not entirely effective. As a consequence, a generated flux has to be set at a value larger than computed for obtaining a desired result. The interrotor comprises an inner cage armature 9 having windings 25 that are electrically non-accessible. The outer cage armature 11 of the interrotor also comprises electrically non-accessible windings 26. Between the rotor 8 and the interrotor 15 a rotor-interrotor gap 27 is present, while an interrotor-stator gap 28 is present between the interrotor 15 and the stator 10.

During operation of the electric variable transmission, magnetic fluxes 29 are induced. A magnetic rotor flux can comprise different components, i.e. a magnetic flux 30 that extends merely in the rotor, a magnetic flux 31 that extends into the rotor-interrotor gap 27, and a flux 32 linking the inner squirrel cage 9 in the interrotor. The above-mentioned components are mutually dependent.

Figure 3:
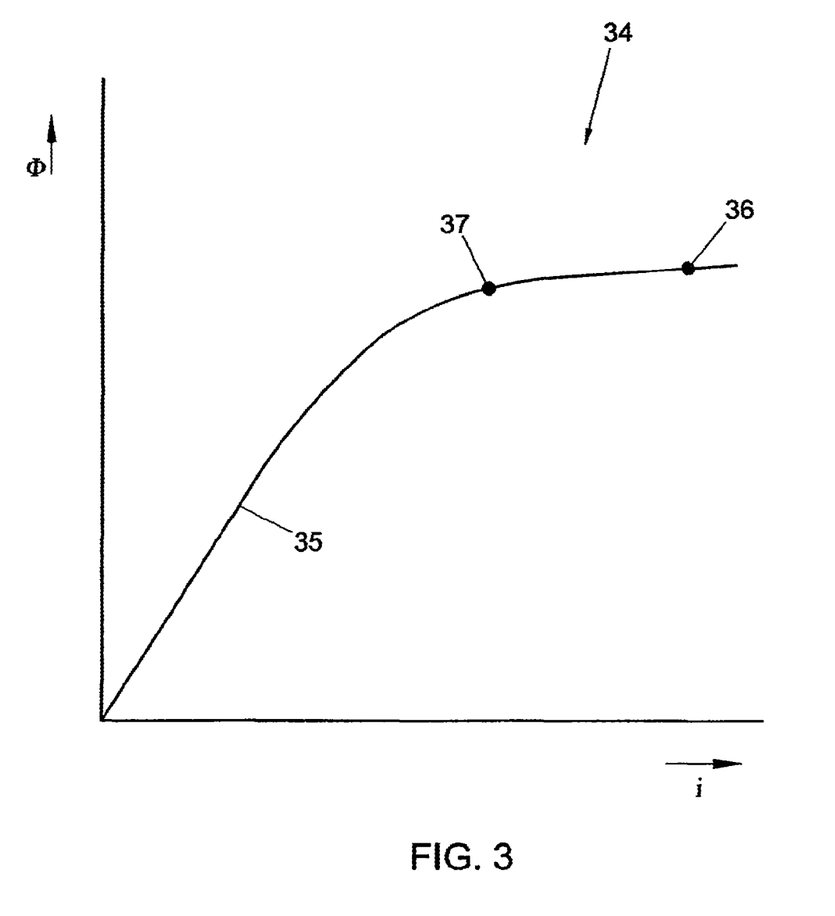
FIG. 3. shows a flux diagram of the interrotor of the electric variable transmission of FIG. 1.

FIG. 3 shows a flux diagram 34 of physical quantities occurring in the interrotor 15 yoke. In more detail, the interrotor magnetic flux $\Phi$ is plotted as a function 35 of an effective interrotor magnetization current i flowing in the stator and/or rotor windings. In small current region, the flux is substantially linearly dependent from the magnetization current. When larger currents flow in the interrotor windings, the flux saturates and the curve 35 flattens. During operation of the electric variable transmission, the interrotor flux $\Phi$ is set at a working point, e.g. a working point 36 in the saturation area where the curve 35 is relatively flat.

In this context, field weakening conditions denote states of the electric variable transmission wherein the flux of the stator is reduced at relatively high rotational speeds to counteract that a back electromagnetic force exceeds pre-specified system requirements.

At relatively high rotational speeds, a direct axis current in the stator generating the stator flux is reduced to restrict voltage differential values. As a consequence, also the stator flux reduces. However, a magnetic flux occurring in the interrotor increases under such stator field weakening conditions if magnetic rotor flux values are maintained.

In prior art systems, the rotor flux is generated in full in order to create a maximum torque. However, according to the invention, the magnetic flux $\Phi$ of the interrotor 15 is indirectly controlled by variably controlling the magnetic rotor flux to obtain a pre-specified performance of the electric variable transmission. More specifically, the magnetic rotor flux control is such that a magnetic saturation in the interrotor decreases.

By reducing the interrotor magnetic flux $\Phi$ the work point 36 is moved to another work point 37 that is more in the linear region of the flux curve 35, so that interrotor is less magnetized and copper losses in the rotor windings are reduced.

Referring again to FIG. 2 it is noted that when reducing the rotor flux control, also the interrotor flux 30-32, and specifically the tangential flux components in the interrotor decreases, thus reducing iron losses in the interrotor, reducing a magnetisation current and improving the overall efficiency of the electromechanical converter.

Figure 4:
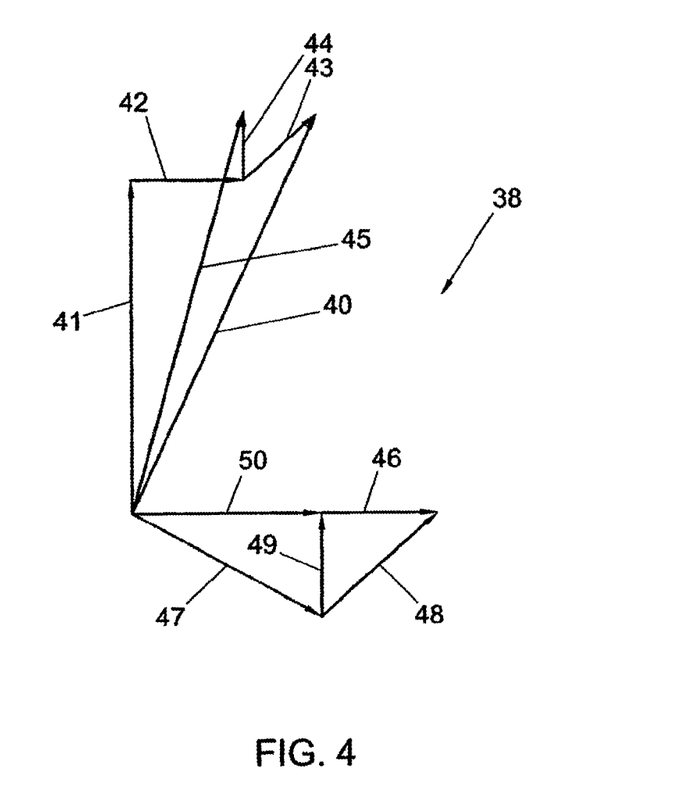
FIG. 4 shows a phasor diagram of physical quantities.

FIG. 4 shows a phasor diagram of the physical quantities depicted in FIG. 3. Here, an initial rotor current 40 corresponding with interrotor flux work point 36 in the saturation area of the flux curve 35 is composed of three components, viz. a current induced by field slip corresponding to the inner squirrel cage current, an air gap magnetization current 42 flowing through the inner air gap inductance and an interrotor magnetization current 43 flowing through interrotor yoke inductance. By reducing the interrotor flux $\Phi$ as indicated above, the interrotor magnetization current reduces to a second phasor state 44 leading to a reduced rotor current 45. As such, FIG. 4 shows again that copper losses in the rotor reduce by moving the work point 36 of the interrotor flux $\Phi$ in the saturation area of the flux curve 35 towards a work point 37 in the linear region.

Similarly, FIG. 4 shows an initial state rotor flux 46 composed of a stator flux 47 and an interrotor flux 48. By modifying the rotor flux from a large value to a second, smaller rotor flux 50, the interrotor flux 48 also reduces to a smaller phasor state 49.

Advantageously, the magnetic flux is reduced by reducing the direct-axis current in the rotor, e.g. by implementing a vector control scheme.

It is noted that the reaction time of the electromechanical converter remains acceptable since the stator can run at a maximum allowable flux level. In a hybrid vehicle, additional torque is available in the millisecond range by increasing a quadrature current to increase a torque. Further, increasing input torque by increasing rotor flux is of the order of hundreds of milliseconds due to the machine time constant which is acceptable as this rate of change is similar to that of a combustion engine driving the converter.

In an embodiment according to the invention, a magnetic rotor flux is determined from desired parameters associated with the interrotor, such as a requested power and output speed of the EVT, a desired engine torque, speed and EVT output torque. In practice, such a magnetic rotor flux can be determined by retrieving a value from a look-up table and/or by numerically modelling the physical behaviour of the electromechanical converter. To that end, according to an aspect of the invention, a controller is provided comprising a processor arranged for operating an electromechanical converter as described above, wherein the processor is arranged for controlling a magnetic rotor flux such that a magnetic saturation in the interrotor decreases.

The method according to the invention can be performed using dedicated hardware components or standard components on which a computer program product is loaded.

The invention is not restricted to the embodiments described herein. It will be understood that many variants are possible.

Figure 5:
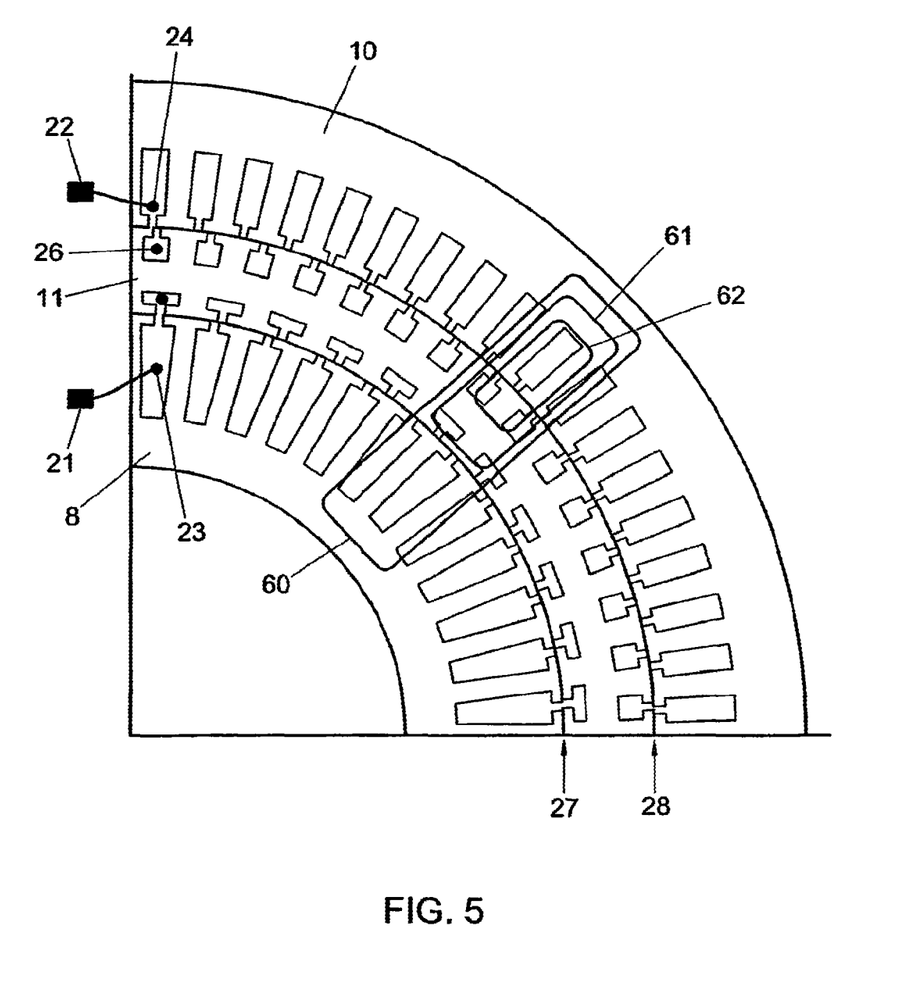
FIG. 5 shows a further flux diagram of the interrotor of the electric variable transmission of FIG. 1.

It is noted that the method according to the invention of operating an electromechanical converter can be applied in a condition wherein a combustion engine drives the converter, or in other drive conditions, such as electric driving conditions wherein the rotor torque is substantially zero. In the latter case, the rotor flux can be set to a value to avoid high magnetization losses and copper losses in the interrotor by balancing the rotor flux and the interrotor flux according to the machine configuration and/or work point. As such, the rotor flux can be set to said value from an initial state wherein the rotor flux is e.g. zero or maximal. Starting from the full flux situation, the rotor flux can be reduced to obtain said value. On the other hand, when starting from the initially zero flux situation, the rotor flux can be increased to arrive at the desired situation wherein the rotor flux has the desired value. FIG. 5 shows a further flux diagram of the interrotor of the electric variable transmission of FIG. 1. Here, the flux diagram represents an electric driving condition wherein the rotor torque is substantially zero. The stator flux comprises different components, e.g. a magnetic flux component 60 that extends through the interotor intor the rotor and a magnetic flux component 61, 62 linking the inner squirrel cage 9 in the interrotor. Again, the rotor flux 60 can be set such that a magnetic saturation in the interrotor decreases, thereby rendering the electromechanical converter more efficient. Thus, by causing a magnetization current in the rotor, iron losses and the total magnetization losses surprisingly reduce. This in contrast with a standard expectation that magnetization currents will increase when causing a magnetization current to flow in the rotor. Other such variants will be obvious for the person skilled in the art and are considered to lie within the scope of the invention as formulated in the following claims.

The invention claimed is:

1. A method of operating an electromechanical converter, in particular an electric variable transmission, provided with a primary shaft having a rotor mounted thereon, a secondary shaft having an interrotor mounted thereon, and a stator, fixedly mounted to the housing of the electromechanical converter, wherein, viewed from the primary shaft in radial direction, the rotor, the interrotor and the stator are arranged concentrically relative to each other, and wherein the rotor and the stator are designed with one or more windings, wherein the interrotor forms one whole both mechanically and electromagnetically, and is arranged as a conductor for magnetic flux in an at least tangential direction, the method comprising the step of variably controlling a magnetic rotor flux such that a magnetic saturation in the interrotor decreases, and the step of determining the magnetic rotor flux from desired parameters associated with the interrotor, wherein the magnetic rotor flux is determined by retrieving a value from a look-up table and/or by numerically modelling the physical behaviour of the electromechanical converter.

2. The method according to claim 1, wherein the one or more windings of the rotor and/or the stator are of a mono- or polyphase type, and are electrically accessible.

3. The method according to claim 2, wherein the interrotor further comprises a magnetic and an electric circuit, the magnetic circuit including a magnetic flux conducting cylinder and the electric circuit including a number of electric circuit-forming windings extending in the flux conducting cylinder, and wherein the interrotor is arranged as a conductor for the magnetic flux in a tangential and radial direction so that exertion of a direct torque between the rotor and the stator can occur upon magnetic saturation of the interrotor.

4. The method according to claim 2, wherein the magnetic rotor flux is reduced under stator field weakening conditions.

5. The method according to claim 2, wherein electrically accessible windings of the rotor and/or the stator are connected to a control unit for controlling electrical currents flowing in the windings.

6. The method according to claim 2, wherein the magnetic rotor flux is reduced the magnetic flux is reduced by reducing the direct-axis current in the rotor, preferably by implementing a vector control scheme.

7. The method according to claim 1, wherein the interrotor further comprises a magnetic and an electric circuit, the magnetic circuit including a magnetic flux conducting cylinder and the electric circuit including a number of electric circuit-forming windings extending in the flux conducting cylinder, and wherein the interrotor is arranged as a conductor for the magnetic flux in a tangential and radial direction so that exertion of a direct torque between the rotor and the stator can occur upon magnetic saturation of the interrotor.

8. The method according to claim 7, wherein the magnetic rotor flux is reduced under stator field weakening conditions.

9. The method according to claim 7, wherein electrically accessible windings of the rotor and/or the stator are connected to a control unit for controlling electrical currents flowing in the windings.

10. The method according to claim 7, wherein the magnetic rotor flux is reduced the magnetic flux is reduced by reducing the direct-axis current in the rotor, preferably by implementing a vector control scheme.

11. The method according to claim 1, wherein the magnetic rotor flux is reduced under stator field weakening conditions.

12. The method according to claim 11, wherein electrically accessible windings of the rotor and/or the stator are connected to a control unit for controlling electrical currents flowing in the windings.

13. The method according to claim 11, wherein the magnetic rotor flux is reduced the magnetic flux is reduced by reducing the direct-axis current in the rotor, preferably by implementing a vector control scheme.

14. The method according to claim 1, wherein electrically accessible windings of the rotor and/or the stator are connected to a control unit for controlling electrical currents flowing in the windings.

15. The method according to claim 14, wherein the magnetic rotor flux is reduced the magnetic flux is reduced by reducing the direct-axis current in the rotor, preferably by implementing a vector control scheme.

16. The method according to claim 1, wherein the magnetic rotor flux is reduced the magnetic flux is reduced by reducing the direct-axis current in the rotor, preferably by implementing a vector control scheme.

17. A controller comprising a processor arranged for operating an electromechanical converter, in particular an electric variable transmission, provided with a primary shaft having a rotor mounted thereon, a secondary shaft having an interrotor mounted thereon, and a stator, fixedly mounted to the housing of the electromechanical converter, wherein, viewed from the primary shaft in radial direction, the rotor, the interrotor and the stator are arranged concentrically relative to each other, and wherein the rotor and the stator are designed with one or more windings, wherein the interrotor forms one whole both mechanically and electromagnetically, and is arranged as a conductor for magnetic flux in an at least tangential direction, wherein the processor is arranged for variably controlling a magnetic rotor flux such that a magnetic saturation in the interrotor decreases and determining the magnetic rotor flux from desired parameters associated with the interrotor, wherein the magnetic rotor flux is determined by retrieving a value from a look-up table and/or by numerically modelling the physical behaviour of the electromechanical converter.

18. A computer program embodied on a non-transitory computer readable medium comprising computer readable code for causing a processor to perform a method of operating an electromechanical converter, in particular an electric variable transmission, provided with a primary shaft having a rotor mounted thereon, a secondary shaft having an interrotor mounted thereon, and a stator, fixedly mounted to the housing of the electromechanical converter, wherein, viewed from the primary shaft in radial direction, the rotor, the interrotor and the stator are arranged concentrically relative to each other, and wherein the rotor and the stator are designed with one or more windings, wherein the interrotor forms one whole both mechanically and electromagnetically, and is arranged as a conductor for magnetic flux in an at least tangential direction, the method comprising the step of variably controlling a magnetic rotor flux such that a magnetic saturation in the interrotor decreases and the step of determining the magnetic rotor flux from desired parameters associated with the interrotor, wherein the magnetic rotor flux is determined by retrieving a value from a look-up table and/or by numerically modelling the physical behaviour of the electromechanical converter.

* * * * *

UNITED STATES PATENT AND TRADEMARK OFFICE
CERTIFICATE OF CORRECTION

PATENT NO. : 8,710,785 B2  Page 1 of 1
APPLICATION NO. : 12/808842
DATED : April 29, 2014
INVENTOR(S) : Darren Leigh Foster It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 967 days.

Signed and Sealed this

Twenty-ninth Day of September, 2015

Michelle K. Lee
*Director of the United States Patent and Trademark Office*